May 1, 1962 D. W. ENOCH ET AL 3,032,418
METHOD OF MAKING A TOTAL DOUGH BATCH FOR BREAD
Filed Nov. 17, 1958
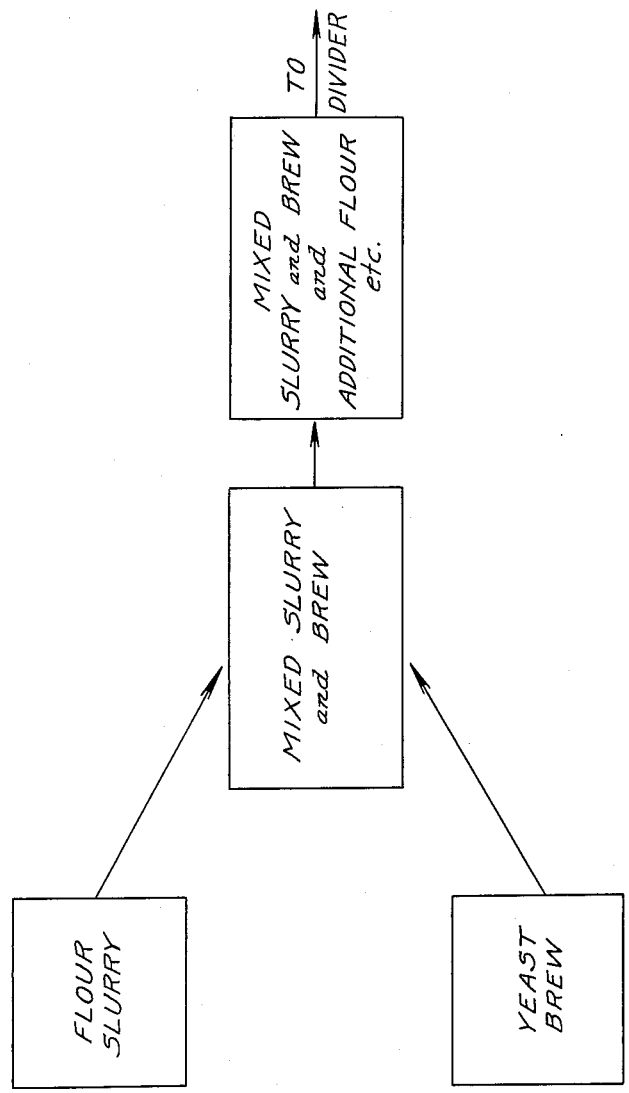
Inventors:
Duard W. Enoch and
Melvin M. Huber
By: Jones, Darbo + Robertson
Attys.

United States Patent Office 3,032,418
Patented May 1, 1962

3,032,418
METHOD OF MAKING A TOTAL DOUGH
BATCH FOR BREAD
Duard W. Enoch, Kansas City, Mo., and Melvin M. Huber, Prairie Village, Kans., assignors to Interstate Bakeries Corporation, Kansas City, Mo., a corporation of Delaware
Filed Nov. 17, 1958, Ser. No. 774,264
2 Claims. (Cl. 99—90)

This invention relates to an improved dough making process for bread and the like, more particularly dough which is leavened by yeast, and a slurry therefor.

Bread dough is by common definition made from flour, i.e., wheat, whole wheat or rye fluor, or mixtures thereof, water, salt and yeast. Usually other ingredients are included such as sugar, milk or milk solids, and shortening, which contribute to the flavor and texture, and one or more dough improvers.

Heretofore, in conventional dough making practice, either in the straight dough process or the sponge and dough process, flour and yeast are initially mixed together so that the two actions of dough formation and development on the one hand, and fermentation and carbon dioxide gas production, on the other hand, take place simultaneously and in the same batch. In these conventional dough making processes, a relatively long period of standing fermentation of bodies of dough, or dough and sponge, have been required, which long standing fermentation time not only objectionably lengthens the bread making period but also makes difficult if not impossible the correction of the dough that may be necessary for a better baking run. The long period of fermentation time also precludes the possibility of adaptation of such conventional methods to a continuous or semi-continuous bread making process and such conventional methods do not lend themselves to the use of instrument controls or automation, requiring, as they do, reliance almost entirely on human skills, with too often unpredictable results and uncertainties and variations in the resulting product.

A variation on the hereinbefore described conventional processes has been suggested of pre-mixing a substantially undeveloped dough, but with the yeast material initially therein, and feeding this continuously through a confined region where it is further worked and developed. This modified method, however, still specified the initial incorporation of the yeast with the initial flour mix.

The present invention contemplates a marked departure from the hereinbefore known dough making processes that involved simultaneous dough conditioning and dough expanding actions, and the substitution therefore of a dough making process characterized by an initially independent flour conditioning mix, without any yeast or other fermentation agent therein, and an initiatlly independent separate yeast brew, both mixes being initially constituted and retained separately in fluid condition, the flour mix in the form of a slurry and the yeast brew in a similar somewhat liquid condition, then mixing the flour slurry and the yeast brew together, and finally adding to the mixed slurry and brew the remainder of the flour for the final mix without any additional water or other liquid. The dough from the final mix may then be processed by conventional apparatus and practices, if desired, such as by being passed to divider, rounder, overhead proofer, molder, and then panned for further rising and baking.

The annexed flow sheet illustrates in general the process steps of the present invention.

A suitable slurry for purposes of the present invention may contain approximately one-half (somewhat more or less) of the total amount of flour which is to be used for a given final batch of dough. From forty-two to fifty-five percent of the total final amount of flour has been found preferable. Sufficient water is added to this amount of flour to establish and maintain a reasonably freely flowable slurry and avoid the formation of gluten strands in the flour. The amount of water in the slurry is determined by the absorptive properties of the flour. But in any case all water, with the exception of the quantity used in the yeast brew, as hereinafter described, is incorporated in the slurry. Preferably, say, about eighty to ninety percent of the total water for the final dough mix is incorporated in the slurry. To this slurry may advantageously be added other ingredients, such as salt, milk and dough improvers. Preferably, all of the salt and all of the milk are incorporated in the slurry. Potassium bromate may also be added. The slurry is mixed until established. Importantly, no yeast is included in the slurry. The milk may be added as dry milk solids.

Simultaneously, if desired, with the making of the slurry just described, and, in any case, separately, the yeast brew is prepared, which desirably includes most of the yeast for the final dough batch and water in the amount of approximately ten percent of the total weight of the flour in the dough batch. The amount of water in the brew is preferably just enough to avoid too heavy a concentration and to assure a vigorous yeast action. The brew desirably contains twenty-five percent of the sugar for the final dough batch. Also, if desired, certain so-called yeast foods such as calcium phosphate or ammonium sulfate may be added to the brew, which are more properly described as chemicals that control or affect yeast action or may act later as dough conditioners.

The slurry and brew are permitted to stand separately for a time after each is mixed but the standing or setting time does not appear to be critical. After a suitable interval, which need not be more than ten minutes, the brew is then added to the slurry. The slurry and brew mixture is mixed until the two are well blended, or say, for about two or three minutes, and then the blended slurry and brew are held for say another twenty minutes or longer, say thirty minutes, before the final flour is added.

After the combined slurry and brew have stood for a suitable period to establish fermentation and gas production, the additional ingredients in a dry state are added for the final mix. Such additional ingredients include the remainder, or say, forty-five to fifty-eight percent of the flour, the remainder, or say, seventy-five percent of the sugar, and the remainder, or say, twenty-five percent of the yeast. Shortening also may be added at this stage, and, if desired, an emulsifier such as monoglyceride, and, also, in season, a mold inhibitor or any other desired dough improvers. The final dough batch is mixed for say ten minutes, depending upon flour requirements as in any conventional dough making process.

The total time up to the point where the final dough batch is ready to go to the divider need be no more than say seventy-five minutes, which is approximately one-fourth of the time required by the sponge and dough process to make the dough ready for the divider.

In the present process there is desirably no fermentation action in the slurry before the brew is added to it. This permits the flour in the slurry to thoroughly hydrate without fermentation, and, further, permits the milk in the slurry to be reconstituted by the water without this occurring in the presence of fermentation. As at present advised it is thought that the placing of the salt in the slurry assists in maintaining the fluidity of the slurry, which in turn permits a relatively greater amount of flour to be used for a given amount of water.

The following proportions of principal ingredients, given on a gram basis for purposes of illustration, have been found to be suitable for white bread, for example:

*Example I*

|  | Slurry | Brew (or Ferment) | Final Dough Mix | Total Batch |
|---|---|---|---|---|
| Flour | 300 |  | 400 | 700 |
| Water | 378 | 70 |  | 448 |
| Salt | 16 |  |  | 16 |
| Milk | 28 |  |  | 28 |
| Yeast |  | 21 | 7 | 28 |
| Sugar |  | 14 | 42 | 56 |
| Shortening |  |  | 28 | 28 |

*Example II*

|  | Slurry | Brew (or Ferment) | Final Dough Mix | Total Batch |
|---|---|---|---|---|
| Flour | 385 |  | 315 | 700 |
| Water | 378 | 70 |  | 448 |
| Salt | 16 |  |  | 16 |
| Milk | 28 |  |  | 28 |
| Yeast |  | 21 | 7 | 28 |
| Sugar |  | 14 | 42 | 56 |
| Shortening |  |  | 28 | 28 |

While the term yeast as here used is intended to include any suitable fermentation agent, the usual compressed yeast is preferably used. Other optional ingredients may be as desired as hereinbefore referred to. The proportions given above may be varied somewhat as will be apparent to those skilled in the art having the benefit of the present disclosure, and particularly for wheat bread, rye bread, sweet rolls, etc.

Addition of the final flour and other ingredients in a dry state to the previously separately and then jointly mixed slurry and brew has been found to yield highly acceptable bread even with relatively wide variations in time intervals, temperatures and ingredient quantities.

The usual optimum temperature range of say, from 80 to 90 degrees F., for yeast development seems to be desirable for both the slurry and the brew, but, otherwise, temperatures do not appear to be critical.

By forming the slurry and the brew separately, each may be readily controlled, and if it is desired to scrap them for any reason, that may be done by simply flushing them down the drain. Although some of the flour is incorporated in the slurry, the latter being somewhat liquid, even more so after adding the brew, does not become dough until the remainder of the flour is added in the final dough mix. Thus, by maintaining the blended slurry and the brew in a fluid state there is no formation of gluten strands in the slurry and the carbon dioxide gas formed therein by fermentation may bubble off, permitting continued physical control of the combined slurry and brew until the final flour is added thereto. The combined slurry and brew also, being still in a fluid state, may be readily scrapped if a breakdown occurs in the plant, thus avoiding the problem of disposing of fermenting dough which once begun continues until the dough is disposed of.

As previously indicated, the final mix ingredients, including the remainder of the flour, are added to the combined slurry and brew without additional water. It is contemplated that if any additional water is added it be incorporated in the slurry, thus again promoting hydration of the flour. Control of the final dough mix is therefore permitted by control of the consistency of the slurry. If the consistency of the slurry is found to vary, this may be readily corrected before the brew is added to the slurry or before the slurry and brew are added to the final dough mix.

The opportunity the slurry phase presents for flour hydration and homogeneous dispersion of ingredients in the final dough mass apparently contributes importantly to the bread flavor and to the tolerance for process variations. This coupled with the comparatively short process time as compared to the sponge-dough process apparently prohibits formation of many undesirable flavor and odor characteristics of the latter. The function served by the brew or ferment phase of the present process is to acclimate the yeast to the environment in which it is going to operate, and to initially stimulate its activity prior to being incorporated into the slurry.

The present process may not only be used for batch production but it also advantageously lends itself to a continuous process in which there would be no final mix batch. In a continuous process, the final flour and other final ingredients would be continuously added to the combined slurry and brew, the latter being previously also continuously separately prepared and then continuously mixed together. The short time preparation of the slurry and brew in the present process are highly important contributing factors in adapting it to a continuous process, as well as to automation.

The invention is not limited to the preparation of any particular type of dough. It is readily adaptable to white bread dough, whole wheat dough, rye dough, sweet-roll dough, bun dough, and the like.

Steps falling within the present invention are defined by the following claims, it being intended to be understood that the selected ingredient percentages and the time intervals are here given by way of illustration and that they may be varied within ranges of the order thereof without departing from the invention. Moreover, accessory ingredients in addition to flour, water, yeast and salt, for example, are optional.

The invention having been described, what is here claimed is:

1. A method of making a total dough batch for bread which is characterized by the steps of: initially separately forming without yeast a flour slurry containing, with respect to the total batch, approximately from forty-two to fifty-five percent of the total flour and approximately from eighty to ninety percent of the water, all of the salt, and all of the milk; initially separately forming a yeast brew without flour, containing with respect to the total batch, approximately three-fourths of the yeast, approximately twenty-five percent of the sugar, and the remainder of the water; next, mixing the previously formed slurry and brew together without additional flour; allowing the combined slurry and brew to stand at a temperature of approximately eight to ninety degrees F. for approximately from twenty to thirty minutes; finally adding a dry state the additional flour for the batch and the remainder of the yeast and sugar; adding shortening; and mixing the whole together.

2. A method of making a total dough batch for bread which is characterized by the steps of: initially separately forming without a fermentation agent a flour slurry containing, with respect to the total batch, approximately one-half of the total flour and approximately from eighty to ninety percent of the water, and all of the salt; initially separately forming a yeast brew without flour, containing, with respect to the total batch, approximately three-fourths of the yeast, approximately twenty-five percent of the sugar, and the remainder of the water; next, mixing the previously formed slurry and brew together without additional flour; allowing the combined slurry and brew to stand at a temperature substantially from eighty to ninety degrees Fahrenheit for approximately from twenty to thirty minutes; finally adding in a dry state the additional flour for the batch and the remainder of the yeast and sugar; and mixing the whole together.

(References on following page)

References Cited in the file of this patent

FOREIGN PATENTS 735,218    Great Britain _____ Aug. 17, 1955
760,044    Great Britain _____ Oct. 31, 1956

OTHER REFERENCES

"The Bakers Digest," April 1954, page 26.

"Cassell's Dictionary of Cookery," 1877, Cassell, Peter, Galpin and Co. (New York), page 45.

"Baking Science and Technology," vol. I, 1952, by Pyler, Siebel Publishing Co. (Chicago), pages 130–131.

"Bakers Digest," June 1957 (vol. 31, No. 3), pages 29, 30, 32, 35, 76.

"The Fleischmann No-Dough Time Process of Making Bread," The Fleischmann Co., received in Patent Office prior to August 1, 1939, 6 pages, pages 2, 3 and 6 relied on.

UNITED STATES PATENT OFFICE
CERTIFICATE OF CORRECTION

Patent No. 3,032,418

May 1, 1962

Duard W. Enoch et al.

It is hereby certified that error appears in the above numbered patent requiring correction and that the said Letters Patent should read as corrected below.

Column 1, line 15, for "fluor" read -- flour --; line 53, for "therefore" read -- therefor --; line 56, for "initiatlly" read -- initially --; column 4, line 51, for "eight" read -- eighty --; lines 52 and 53, after "adding" insert -- in --.

Signed and sealed this 11th day of September 1962.

(SEAL)
Attest:

ERNEST W. SWIDER
Attesting Officer

DAVID L. LADD
Commissioner of Patents